United States Patent
Andrews

(10) Patent No.: US 9,269,510 B2
(45) Date of Patent: Feb. 23, 2016

(54) CONTROL PANEL WITH FASHION BUTTONS

(71) Applicant: Kelsey-Hayes Company, Livonia, MI (US)

(72) Inventor: Michael J. Andrews, Plymouth, MI (US)

(73) Assignee: Keisey-Hayes Company, Livonia, MI (US)

( * ) Notice: Subject to any disclaimer, the term of this patent is extended or adjusted under 35 U.S.C. 154(b) by 101 days.

(21) Appl. No.: 14/155,395

(22) Filed: Jan. 15, 2014

(65) Prior Publication Data

US 2015/0200064 A1    Jul. 16, 2015

(51) Int. Cl.
| | |
|---|---|
| *H01H 13/14* | (2006.01) |
| *H01H 13/02* | (2006.01) |
| *G06F 3/044* | (2006.01) |
| *G06F 3/039* | (2013.01) |

(52) U.S. Cl.
CPC .............. *H01H 13/14* (2013.01); *G06F 3/039* (2013.01); *G06F 3/044* (2013.01); *H01H 13/023* (2013.01); *H01H 2219/036* (2013.01)

(58) Field of Classification Search
CPC ...... H01H 13/48; H01H 13/14; H01H 13/705
USPC ........................................................... 200/406
See application file for complete search history.

(56) References Cited

U.S. PATENT DOCUMENTS

| | | | | |
|---|---|---|---|---|
| 4,492,838 | A | * | 1/1985 | Fukukura ..................... 200/517 |
| 5,239,152 | A | | 8/1993 | Caldwell et al. |
| 5,389,755 | A | | 2/1995 | Chen |
| 6,590,508 | B1 | | 7/2003 | Howell et al. |
| 8,493,355 | B2 | | 7/2013 | Geaghan et al. |
| 2010/0066572 | A1 | | 3/2010 | Dietz et al. |
| 2011/0284354 | A1 | * | 11/2011 | Kato et al. ..................... 200/406 |
| 2012/0268395 | A1 | | 10/2012 | Wang et al. |

OTHER PUBLICATIONS

PCT/US2015/010096 International Search Report and Written Opinion, completed Mar. 1, 2015.

\* cited by examiner

*Primary Examiner* — Edwin A. Leon
*Assistant Examiner* — Ahmed Saeed
(74) *Attorney, Agent, or Firm* — Tarolli, Sundheim, Covell & Tummino LLP

(57) ABSTRACT

Control apparatus for an electrical or electronic device. The apparatus includes a substrate having a surface with a selected contour. A cover lays over the surface of the substrate and conforms to the contour. A touch matrix is sandwiched between the substrate and the cover. At least one fashion button is mounted at the front surface of the cover. Manipulation of the fashion button is detected by the touch matrix.

16 Claims, 3 Drawing Sheets

CONTROL PANEL WITH FASHION BUTTONS

FIELD OF THE INVENTION

The present invention is directed to a control panel including control elements such as switches and the like, where the control elements include fashion buttons.

BACKGROUND

Electrical controls used on vehicle dashboards historically have included an assortment of discrete control elements such as switches, knobs, dials, slide levers etc. The control elements often are assembled into large integrated assemblies that are in turn installed into the dashboard of the vehicle. More recently, control panels have been designed in which multiple control functions are implemented with a single, pressure sensitive contact panel.

Tactonic Technologies (www.tactonic.com) has developed a multi-contact, pressure sensitive touch panel that may be used with passive overlays to provide the function of an array of discrete control elements from only a single touch panel. The touch panels and passive overlays are flexible and may be applied to curved surfaces as well as flat surfaces. As presented on their website, Tactonic contemplates that their touch panels may be used in various industries including the automotive industry. The touch panels are also described in patent applications US 2012/0086659 A1, US 2012/0087545 A1, US 2012/0089348 A1, and US 2013/0275057 A1.

SUMMARY OF THE INVENTION

The present invention provides control apparatus for controlling at least one electrical or electronic device, where the control apparatus includes one or more control elements, such as buttons, knobs, and the like.

In accordance with one example embodiment of the present invention, control apparatus is provided for an electrical or electronic device. The apparatus includes a substrate having a surface with a selected contour. A cover lays over the surface of the substrate and conforms to the contour. The cover is formed of a thin, flexible, sheet having a back surface facing the substrate and a front surface facing away from the substrate, where the front surface forms the outside surface of the apparatus and is thereby visible from outside of the apparatus. A touch matrix is sandwiched between the substrate and the cover. The touch matrix is comprised of a thin, flexible sheet conforming to the contour. The touch matrix provides signals for controlling the electronic device in response to pressure sensed at various places thereon. At least one fashion button is mounted at the front surface of the cover and is manually pressable towards the cover whereby, when the fashion button is manually pressed, the resulting pressure is transmitted from the button through the cover to the touch matrix and is sensible by the touch matrix.

BRIEF DESCRIPTION OF THE DRAWINGS

The foregoing and other features and advantages of the present invention will become apparent to those skilled in the art to which the present invention relates upon reading the following description with reference to the accompanying drawings, in which.

DETAILED DESCRIPTION

Figure 1:
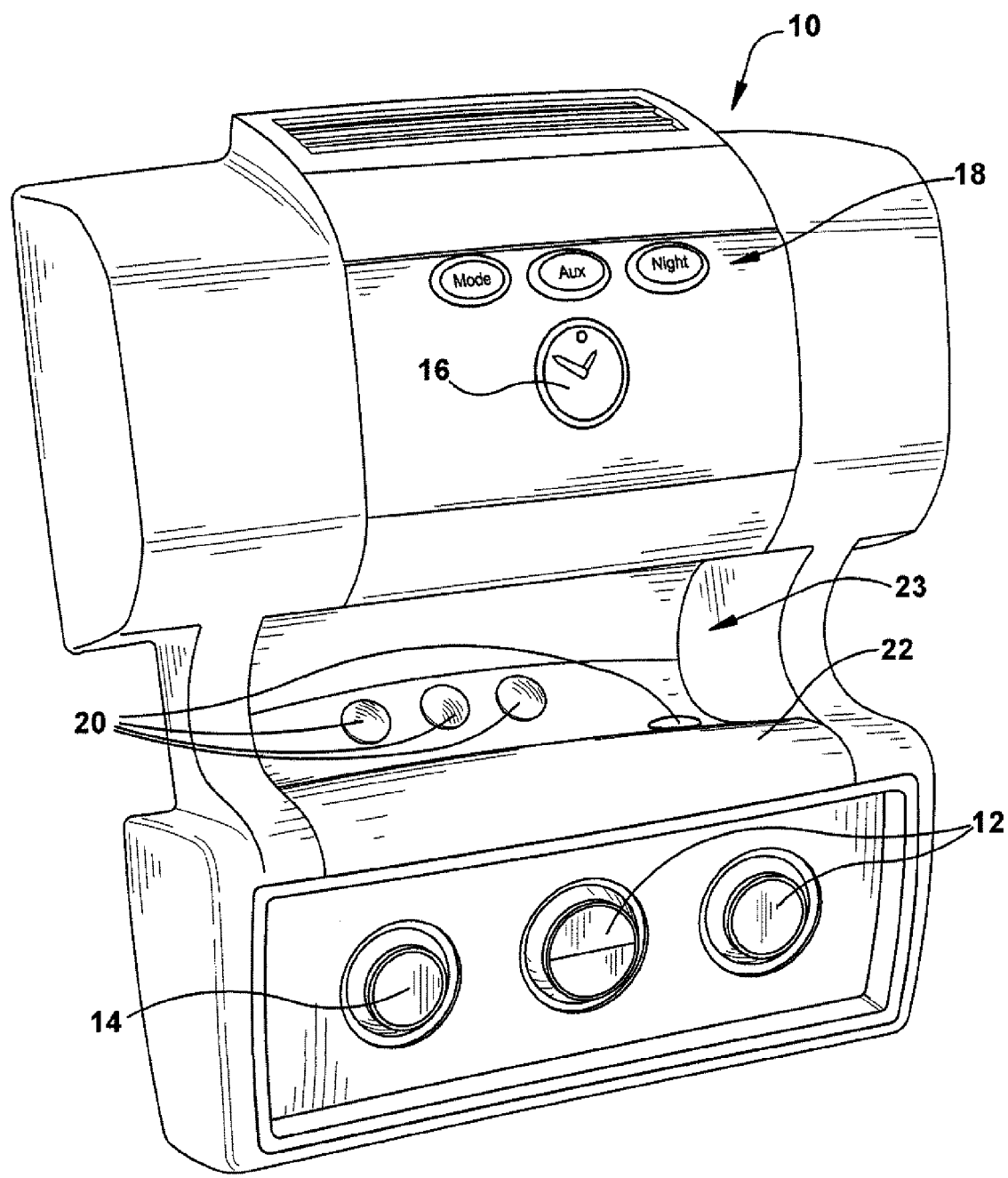
FIG. 1 is a perspective illustration of a vehicle center stack having a control panel incorporating one example embodiment of the present invention.

Referring to FIG. 1, a mockup is shown of a center stack console 10 for a vehicle such as a sports utility vehicle or a passenger car. The center stack console 10 is located on the vehicle dashboard between the driver and passenger seats, and typically includes control elements such as switches and dials for controlling vehicle devices and systems such as entertainment and/or communication systems, environmental conditioning systems (heating, ventilation, air conditioning—"HVAC"), and other similar electrical or electronic systems of the vehicle. The mockup of the center stack console shown in FIG. 1 represents these various controls with HVAC controls 12, a sound volume control 14, a clock 16, and other conventional switches indicated at 18.

The mockup of FIG. 1 incorporates control elements 20 in accordance with one embodiment of the present invention. In the example embodiment illustrated in FIG. 1, the control elements 20 are mounted on a surface 22 that serves as the floor or base of a recessed bay or alcove 23 within the center stack console 10. In the example embodiment of FIG. 1, surface 22 is a continuous, smoothly varying curvilinear surface. In other embodiments, it might be flat or have some other chosen contour. As can generally be seen in FIG. 1, the control elements 20 include fashion buttons, described in detail below, that are fastened upon the contoured surface 22. The surface 22, described in detail below, incorporates an active touch matrix that is sensitive to pressure, and that provides electrical signals in response to pressure thereon. When a person in the vehicle manipulates one or more of the control elements 20, the active touch matrix senses the location and strength of the touch and responds by providing electrical signals for controlling the related electrical or electronic device.

Figure 2:
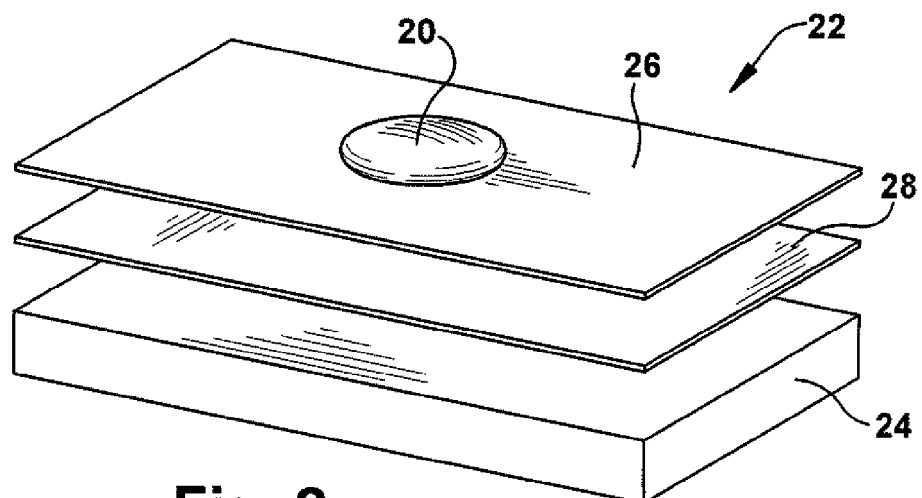
FIG. 2 is an exploded sectional view of a portion of the control panel of FIG. 1 in accordance with one example embodiment of the present invention.

FIG. 2 is a view of one of the control elements 20 and the associated portion of surface 22. The FIG. 2 view is exploded, to better show the laminated structure of the surface. As shown in the figure, the laminated structure includes a substrate 24 and cover 26. The substrate 24 may be attached to the center stack console 10 in any conventional fashion, for example via integral snap features or separate mechanical fasteners. The cover 26 may be formed of any suitable flexible material such as sheet plastic, leather, or fabric. The cover might, for example, be comprised of a sheet of conventional fabric such as denim or corduroy. A touch matrix 28, known per se, is sandwiched between the substrate 24 and cover 26. In normal use, the three layers 24, 26, and 28 will be laying over one another in intimate, touching contact. Indeed, it is contemplated that the cover 26 will usually be glued or otherwise adhered to touch matrix 28, although the adhesive used may be quite weak to permit easy replacement of the cover with a different cover formed of some other material or having some other surface color or pattern.

Figure 3A:
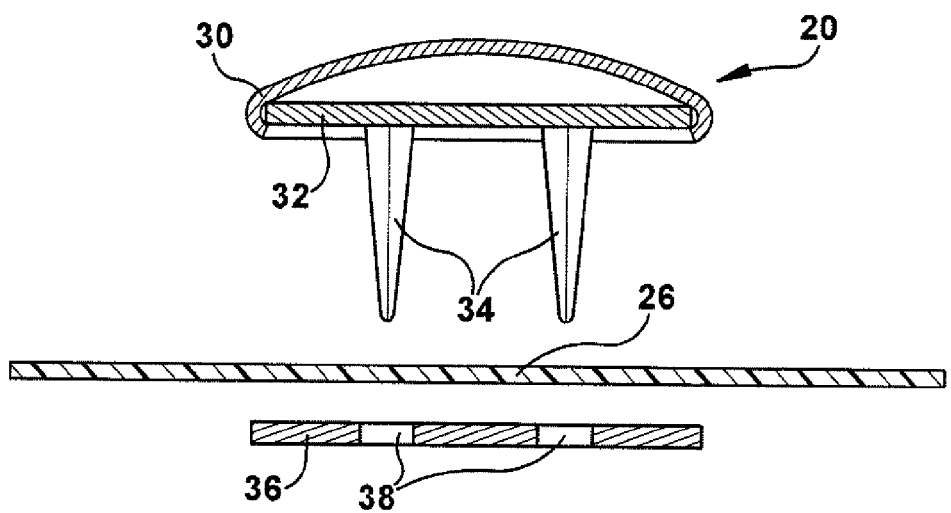
FIGS. 3(a) and (b) show the manner in which the fashion button of the example embodiment of FIGS. 1 and 2 may be attached to the cover.
Figure 3B:
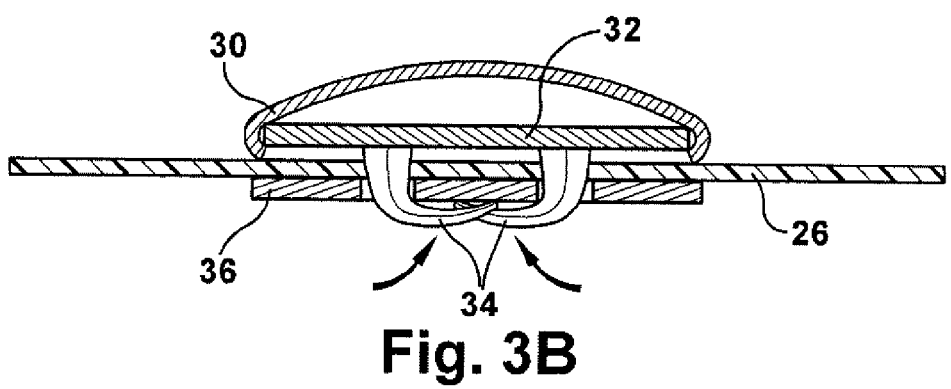

In FIGS. 3(a) and (b) it is seen that control element 20 itself comprises three cooperating elements, including a dome-shaped fashion button top 30, a prong base 32 from which two prongs 34 have been stamped out, and a coin-shaped retainer 36 having openings 38 sized and positioned to receive the two prongs from the prong base 32. The fashion button top 30 receives the base 32 within its concave side, and the perimeter of the button is crimped under and around the base, securely fastening the fashion button top to the base. The base 32 is a circular disk of sheet metal from which prongs have been stamped out via a conventional die-stamping process. The prongs protrude more or less perpendicularly from the base and are sharp enough to pierce the cover material. The prongs pass through openings 38 in retainer 36 and are folded over towards one another (see FIG. 3(b)) to secure button top 30 to cover 26. Retainer 34 may have a central depression or well, not shown, that is deep enough to contain the folded-over prongs whereby the retainer, rather than the prongs, contacts touch matrix 28.

Figure 4:
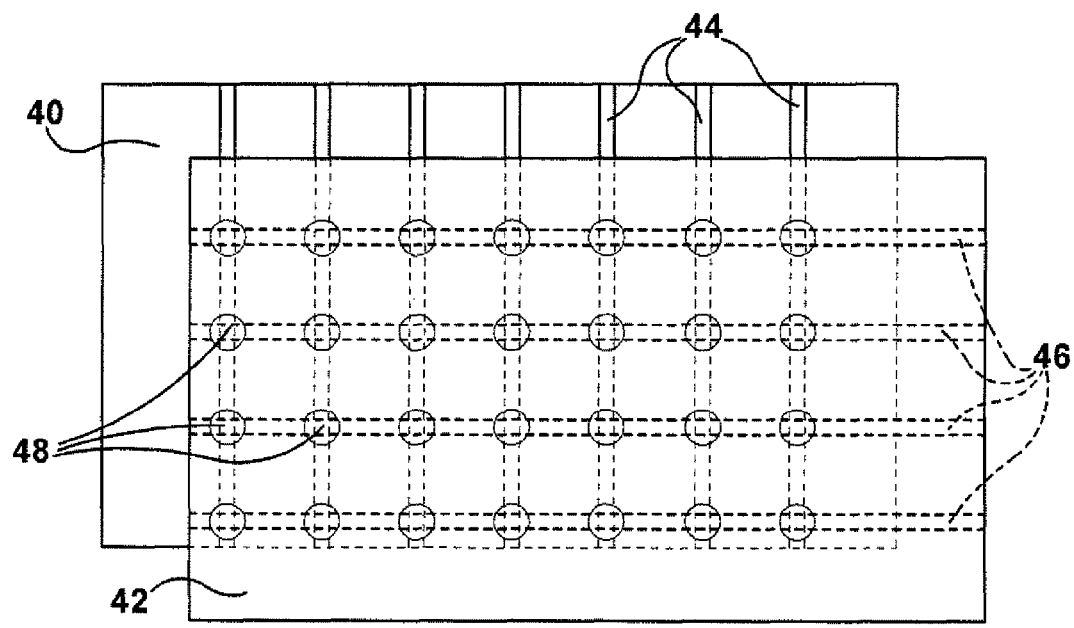
FIG. 4 shows the detail of the touch matrix, known per se, that could be used in the embodiment shown in FIGS. 1 through 3.

The touch matrix 28 may take any conventional form such as, for example a touch panel available from Tectonic Technologies LLC. FIG. 4 is a schematic representation of the elements of one such touch matrix that may be used in the present invention. In FIG. 4, touch matrix 28 has its own laminated structure, and is comprised of two sheets 40 and 42. To promote description of the touch matrix, only a portion of each sheet is shown in FIG. 4. In an actual touch matrix, the sheets 40 and 42 are larger, have generally the same size, are disposed in complete overlapping alignment, and are bonded together to form a single composite but flexible structure.

Each of the two sheets 40 and 42 is comprised of a non-conductive sheet material with a regular series of straight, parallel, conductive trace lines 44 and 46, respectively, printed thereon. Conductive traces 44 on sheet 40 run perpendicular to conductive traces 46 on sheet 42. The sheets are oriented so the surfaces that carrying the respective printed traces face one another. Thus, when sheets 40 and 42 are assembled, the traces of the respective sheets intersect in a matrix of locations 48 at regularly spaced intervals across the surface of the sheets. A small amount of force sensitive resistive (FSR) material, unnumbered, is printed at spaced intervals over one set of traces, in registration with the points of intersection 48 with the traces on the other sheet. Thus, at each intersection, the conductive trace on one sheet faces the conductive trace on the other sheet but is separated from that trace by the FSR material. At each intersection 48, the electrical resistance between the two traces will depend upon the pressure experienced by the FSR at that intersection.

A touch on the surface of the material can be detected and localized by electronically scanning the traces 44 and 46 and quantifying the resistance at each intersection. The scanning process and apparatus, which will typically include a firmware-controlled microcontroller, are known per se and will not be described in detail herein. It will be noted, however, that the process is sensitive enough that any application of pressure to the surface of the touch matrix, in one or multiple locations, can easily be detected and its location(s) discriminated. The electronics will perform control actions depending upon touches sensed by the touch matrix.

One button 20, or many buttons in a specific arrangement, may be installed on the cover 26, depending upon the needs of the particular application. Any touch on one or more of the buttons 20 will be felt by the underlying portion of the touch matrix 28 and accordingly sensed by the electronics. Specific electronic devices will be operated depending upon the location, on the touch matrix, of the button pressed by the operator. For example, various buttons may be associated with interior or exterior vehicle lighting, or with HVAC controls, or with vehicle entertainment systems or telecommunications.

When a button is pressed by the driver or a passenger, the electronics will react to the pressure by identifying its location, looking up (e.g. in a table) the function to be performed in connection with a touch at that location, and then performing the action or series of actions indicated by the information obtained from the look-up function. One such action may be to provide an audible 'click' sound and/or a small panel vibration, as positive tactile or audible feedback to the operator.

The example embodiment shown is very flexible, in that the location and number of buttons 20 can be changed merely by changing the cover 26 and associated buttons, while making cooperating changes in the programming of the electronics associated with the touch matrix. Moreover the buttons may be changed out for either functional or aesthetic reasons without changing any of the rest of the electronics. With this approach, highly stylized fashion buttons, of the type found on clothing or other lifestyle products, may be used as automotive controls. Further, the fashion button could be molded first from a clear plastic and then finished with an opaque plastic or metal button cap covering all but a region defining a symbol or text. LED or other illumination windowed through the substrate 24 could in this case backlight the button and prominently illuminate the symbol or text.

Many other forms of fashion buttons could be used in place of the button shown and described in the preceding example embodiment. A convention snap fastener could be used, giving the convenience of interchanging buttons merely by snapping off the existing button and snapping on a different one. Interchanging of buttons might be desirable to re-label a button, or to change the emblem, design, color, or even material or dimensions of the fashion button. The design used for the button cap 30 could, for example, be similar to a design used in the clothing industry, such as a coat closure or similar clothing button. The design need not be identical to a clothing industry design, of course, but could be evocative of such a design, as for example shown in FIGS. 5 and 6.

Figure 5:
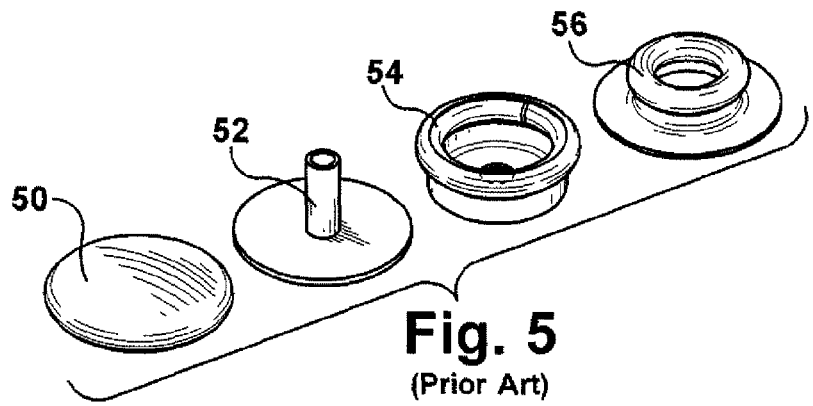
FIG. 5 shows the individual components of a snap, known per se, that could be installed and used as a fashion button in another embodiment of the present invention; and, FIG. 6 shows yet another form of a button, known per se, that could be used as a fashion button in connection with the present invention.

A conventional snap fastener set, shown in FIG. 5, comprises a cap 50, a post 52, a snap 54, and a stud 56. Snap 54 could be attached to the cover and stud 56 attached to the cap, or vice versa. The snap 54, if attached to the cover, will be secured to the cover by post 52. More specifically, the cylindrical central portion of post 52 will pierce the cover from below and be received on the other side of the cover within a central hole in snap 54. The central portion of post 52 will then be mushroomed over by a suitable forming die to securely fasten the two components together. Cap 50, in the other hand, will be crimped over the edges of stud 56 in a manner similar to the crimping of fashion button 30 over prong base 32. As stated above, the positions of the snap 54 and stud 56 could as easily be reversed.

Figure 6:
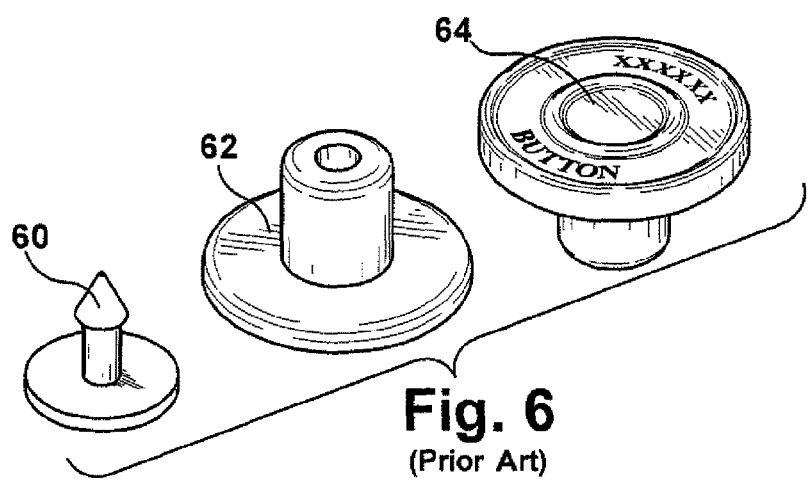

FIG. 6 illustrates an alternative, also known per se, wherein the four elements of a conventional snap set are replaced by only two elements—a metal tack 60 and a button (62, 64). The button is shown twice in the figure, once upside down at 62 and once upright at 64. Button 62 includes a metal button cap and a plastic core (unnumbered). The button cap may bear a design or emblem recognizable from some other industry, such as the clothing industry. Metal tack 60 has a pointed central nail that will pierce cover 26 from the bottom and be received within and permanently held in an interference fit with the plastic core of button 62.

In the embodiments described above, fashion button 20 is secured to cover 26 and is not individually anchored to the touch matrix 28 or substrate 24. It is contemplated, although not presently preferred, that fashion button 20 could be secured by a fastener that passes through both cover 26 and touch matrix 28 to be received within substrate 24. In such a case, the fastener would be positioned to pierce touch matrix 28 at a location that did not create an electrical short in the touch matrix or otherwise compromise the touch matrix, for example passing through a location between adjacent ones of traces 44 as well as adjacent ones of traces 46, preferably equally spaced from the four nearest intersections 48. Further, the fastener would need to allow some movement of button 20 relative to touch matrix 28 so that pressure on the button by a finger or hand would translate into a change in the pressure on the underlying region of touch matrix 28. If the button fastener were to extend through the substrate 24 in this fashion, the fastener could include a transparent core to pipe light, from a source below the substrate, into and through the button.

Due to the distributed sensitivity of the touch matrix, the system is capable of discriminating between different types of manipulation of the fashion button. For example, the application of pressure to the distal edge of the button (relative to the seats of the vehicle) will produce a different touch matrix signature than the application of pressure to the near edge of the button. Similar differences will exist for pressure on the left and right edges of the button. These differences may be exploited to use the same fashion button for more complicated controls. Pushing the distal edge may increase radio volume, for example, whereas pushing the near edge may decrease radio volume. Running a finger around the button in clockwise and counterclockwise directions may similarly result in the increase or decrease of some control function.

From the above description of the invention, those skilled in the art will perceive improvements, changes and modifications. Such improvements, changes and modifications within the skill of the art are intended to be covered by the appended claims.

Having described the invention, the following is claimed:

1. Control apparatus for an electrical or electronic device, comprising:
   a substrate having a surface with a selected contour;
   a cover laying over said surface of said substrate and conforming to said contour, said cover being formed of a thin, flexible, sheet having a back surface facing said substrate and a front surface facing away from said substrate, said front surface forming the outside surface of said apparatus and thereby being visible from outside of said apparatus;
   a touch matrix sandwiched between said substrate and said cover, said touch matrix comprising a thin, flexible sheet conforming to said contour, said touch matrix providing signals for controlling said electrical or electronic device in response to pressure sensed at various places thereon;
   at least one fashion button comprises a button top and a prong base, said prong base being attached to the rear of said button top, said prong base having at least two prongs projecting rearward therefrom and penetrating said cover, said at least one fashion button being mounted at the front surface of said cover and manually pressable towards said cover whereby, when said fashion button is manually pressed, the resulting pressure is transmitted from said button through said cover to said touch matrix and is sensible by said touch matrix.

2. Control apparatus as set forth in claim 1, wherein said fashion button comprises a discrete button positioned above a selected location on said cover and a fastener extending through said cover and fastening said discrete button at said selected location.

3. Control apparatus as set forth in claim 2, wherein said fastener extends into and is retained by said substrate.

4. Control apparatus as set forth in claim 2, wherein said fastener comprises at least one projection attached to said discrete button and projecting toward and through said cover, and a retainer for receiving said projection on the opposite side of said cover.

5. Control apparatus as set forth in claim 4, wherein said projection includes a snap fastener for removably attaching said discrete button to said projection, said snap fastener comprising a stud and a snap, each attached to a respective one of said discrete button and said projection.

6. Control apparatus as set forth in claim 2 and further including a source of illumination behind said substrate, wherein said fastener is at least partially transparent to visible light to permit light from said source to reach the back of said fashion button.

7. Control apparatus as set forth in claim 1, wherein said at least one fashion button comprises multiple fashion buttons mounted at the front surface of said cover and manually pressable towards said cover whereby, when any of said fashion button is manually touched, the resulting pressure of the touch is transmitted from said button through said cover to said touch matrix and is sensible by said touch matrix.

8. Control apparatus as set forth in claim 1, wherein said touch matrix includes force sensitive resistors arranged so that said touch matrix can distinguish between touches upon different portions of said at least one fashion buttons.

9. Control apparatus as set forth in claim 1, wherein said at least one fashion button comprises a button having an appearance evocative of a design used in the clothing industry.

10. Control apparatus for an electrical or electronic device, comprising:
   a substrate having a surface with a selected contour;
   a cover laying over said surface of said substrate and conforming to said contour, said cover being formed of a thin, flexible, sheet having a back surface facing said substrate and a front surface facing away from said substrate, said front surface forming the outside surface of said apparatus and thereby being visible from outside of said apparatus;
   a touch matrix sandwiched between said substrate and said cover, said touch matrix comprising a thin, flexible sheet conforming to said contour, said touch matrix providing signals for controlling said electrical or electronic device in response to pressure sensed at various places thereon;
   said at least one fashion button mounted at the front surface of said cover and manually pressable towards said cover whereby, when said fashion button is manually pressed, the resulting pressure is transmitted from said button through said cover to said touch matrix and is sensible by said touch matrix, wherein said at least one fashion button comprises a button top and a prong base, said prong base being attached to the rear of said button top, said prong base having at least two prongs projecting rearward therefrom and penetrating said cover, and a retainer disposed on the opposite side of said cover, said prongs passing through said retainer and folded over at the rear of said retainer to thereby capture said cover between said button top and said retainer.

11. Control apparatus for an electrical or electronic device, comprising:
- a substrate having a surface with a selected contour;
- a touch matrix laying over said substrate, said touch matrix comprising a thin, flexible sheet conforming to said contour, said touch matrix providing signals for controlling said electrical or electronic device in response to touches sensed at various places thereon;
- a cover laying over said touch matrix, said cover being formed of a thin, flexible, sheet having a back surface facing said touch matrix and a front surface facing away from said touch matrix, said front surface forming the outside surface of said apparatus and thereby being visible from outside of said apparatus;
- a plurality of discrete fashion buttons comprising a fastener extending through said cover and fastening said discrete button at said respective selected location, wherein at least one of said fasteners includes at least one projection attached to said discrete button and projecting toward and through said cover, and a retainer on the opposite side of said cover for receiving said projection, each of the plurality of discrete fashion buttons being fastened in a selected arrangement across said cover so that, when any of said fashion buttons is manually touched, the resulting touch is transmitted from said button through said cover to said touch matrix and is sensible by said touch matrix.

12. Control apparatus as set forth in claim 11, wherein said touch matrix includes force sensitive resistors arranged so that said touch matrix can distinguish between touches upon different portions of at least one of said fashion buttons.

13. Control apparatus as set forth in claim 11, wherein each of said fashion buttons comprises a discrete button positioned above a respective selected location on said cover.

14. Control apparatus as set forth in claim 13, wherein said projection includes a snap fastener for removably attaching to said discrete button to said projection, said snap fastener comprising a stud and a snap each attached to one of said discrete button and said projection.

15. Control apparatus as set forth in claim 11 and further including at least one source of illumination behind said substrate, wherein each said fastener is at least partially transparent to visible light to permit light from said at least one source to reach the back of a respective said fashion button.

16. Control apparatus as set forth in claim 11, wherein at least one of said fashion button comprises a button having an appearance evocative of a design used in the clothing industry.

* * * * *